United States Patent [19]
Randriazanamparany et al.

[11] Patent Number: 5,121,649
[45] Date of Patent: Jun. 16, 1992

[54] MOTORIZED GEAR SHIFT CONTROL APPARATUS FOR A TRANSMISSION GEARBOX, IN PARTICULAR FOR AUTOMOTIVE VEHICLES

[75] Inventors: Vévé R. Randriazanamparany, Rueil-Malmaison; Jean-Paul Lallemand, Saint-Benoit, both of France

[73] Assignee: Valeo, Paris, France

[21] Appl. No.: 677,761

[22] Filed: Mar. 29, 1991

[30] Foreign Application Priority Data

Mar. 30, 1990 [FR] France .................. 90 04075

[51] Int. Cl.[5] .............................................. B60K 17/08
[52] U.S. Cl. ...................................................... 74/335
[58] Field of Search .................. 74/335, 337.5, 473 R

[56] References Cited

U.S. PATENT DOCUMENTS

| | | | |
|---|---|---|---|
| 4,821,590 | 4/1989 | Tury et al. | 74/335 |
| 4,852,421 | 8/1989 | Kerboul | 74/473 R X |
| 4,856,360 | 8/1989 | Yoshimura et al. | 74/335 |
| 4,873,881 | 10/1989 | Edelen et al. | 74/335 X |
| 4,899,607 | 2/1990 | Stainton | 74/335 |
| 4,911,031 | 3/1990 | Yoshimura et al. | 74/335 |

FOREIGN PATENT DOCUMENTS

| | | |
|---|---|---|
| 0310387 | 4/1989 | European Pat. Off. |
| 2331647 | 1/1975 | Fed. Rep. of Germany |
| 3128266 | 2/1983 | Fed. Rep. of Germany |
| 1497939 | 10/1966 | France |
| 2609138 | 7/1988 | France |
| 2632038 | 12/1989 | France |
| 8301889 | 12/1984 | Netherlands |

*Primary Examiner*—Leslie A. Braun
*Assistant Examiner*—Ryan W. Massey
*Attorney, Agent, or Firm*—Longacre & White

[57] ABSTRACT

A motorized gear shift control apparatus for a transmission gearbox of the kind having fixed gear ratios and a neutral position, comprising a first actuator which actuates a receptor element through a linkage having an output element coupled to the receptor element. The receptor element operates the gear shifting apparatus of the gearbox itself. The output element is mounted by means of the receptor element, so as to be moveable in rotary and/or translational movement, and the linkage includes an intermediate element for actuating the output element in response to the action of the first actuator. The output element is adapted so that during its displacement it can intercept and/or transverse a cam or ramp which is moveable in a fixed support. A second actuator is provided for moving the ramp in translational movement.

9 Claims, 11 Drawing Sheets

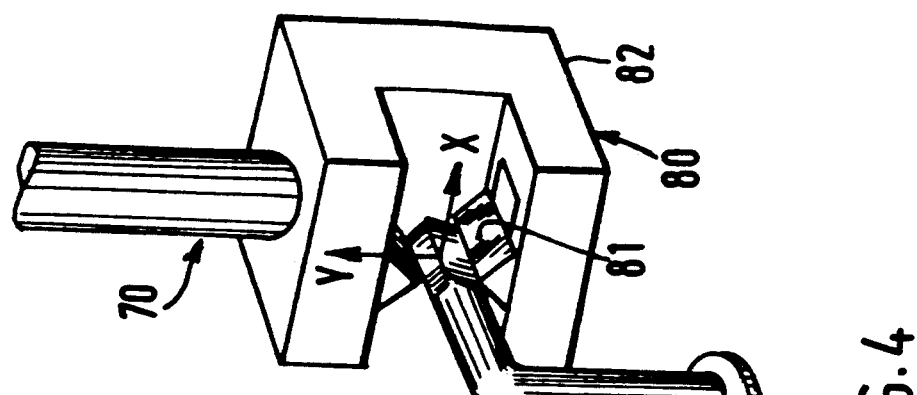
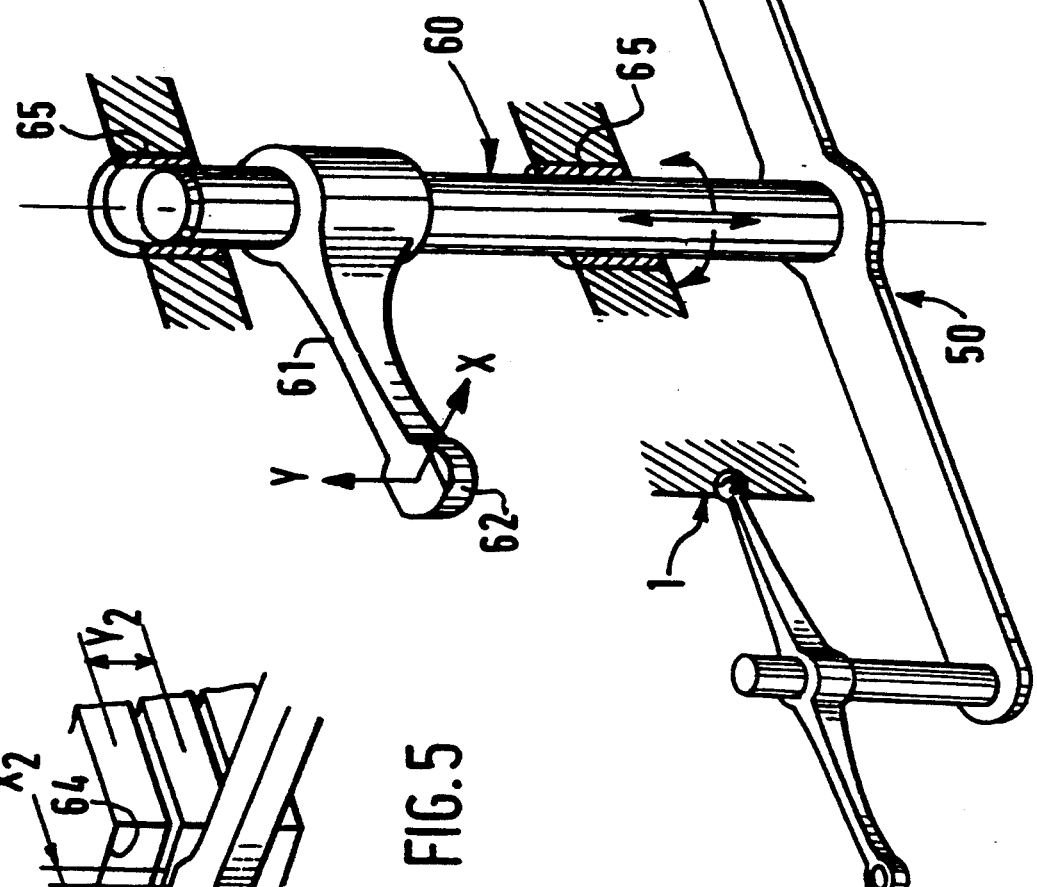
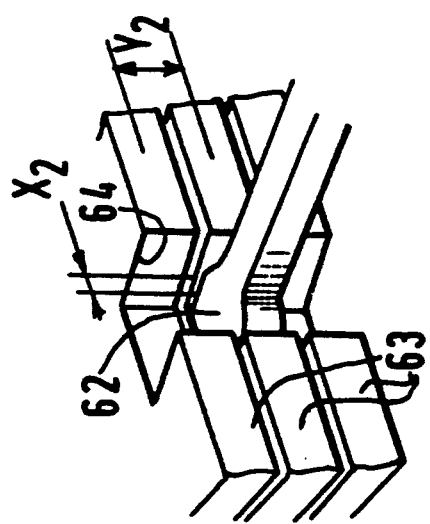
FIG. 4
FIG. 5

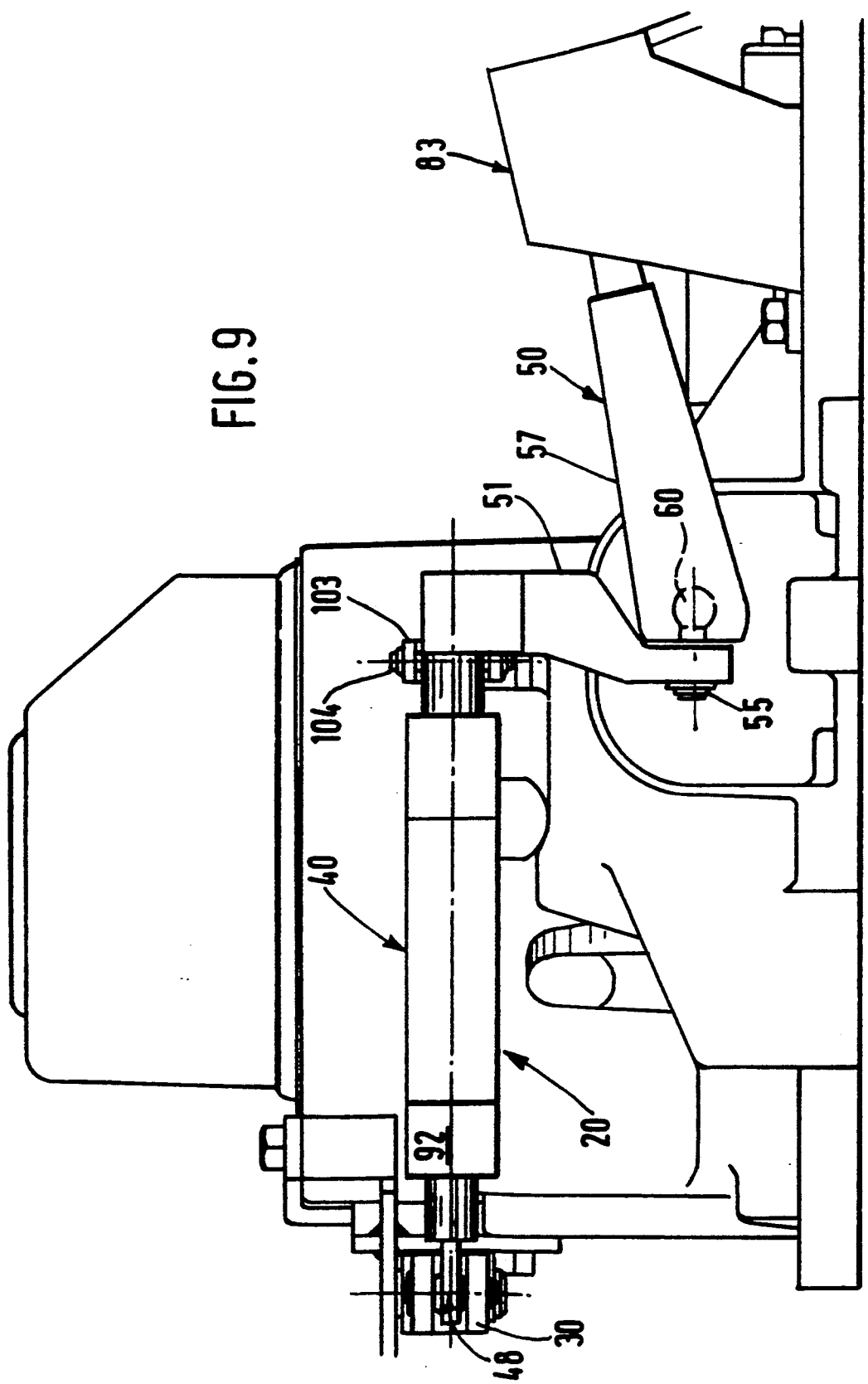

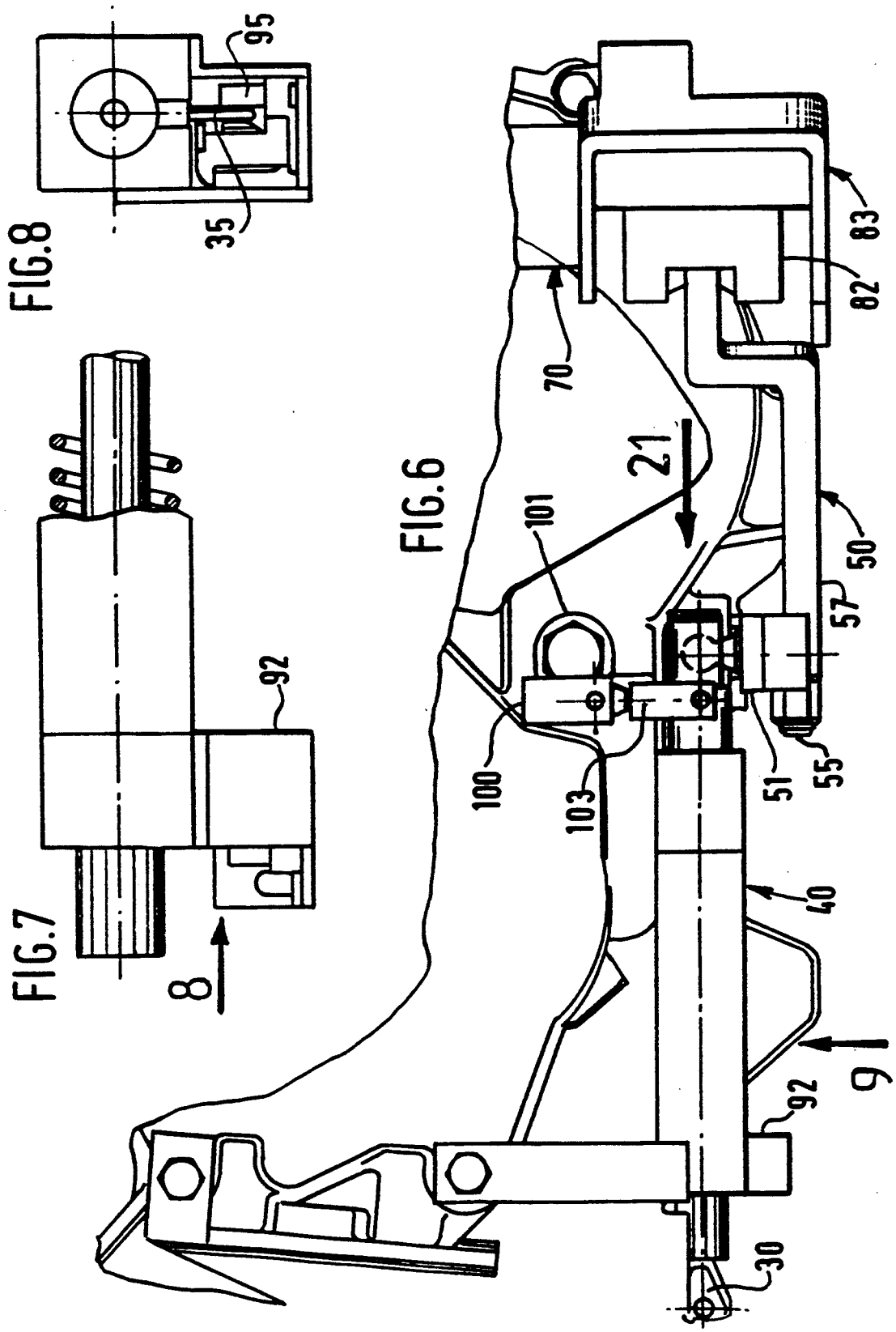

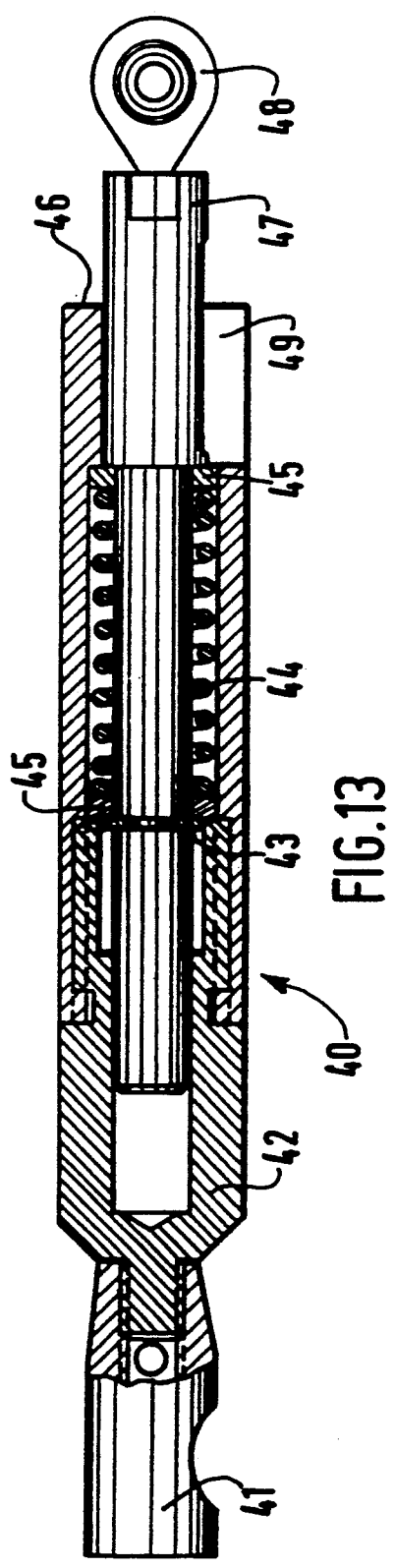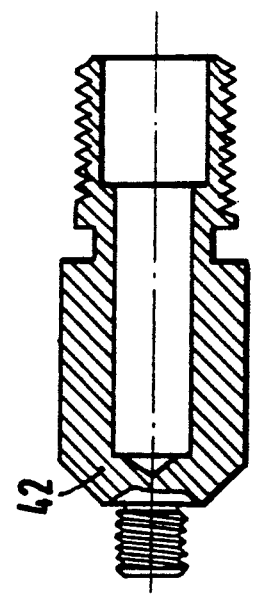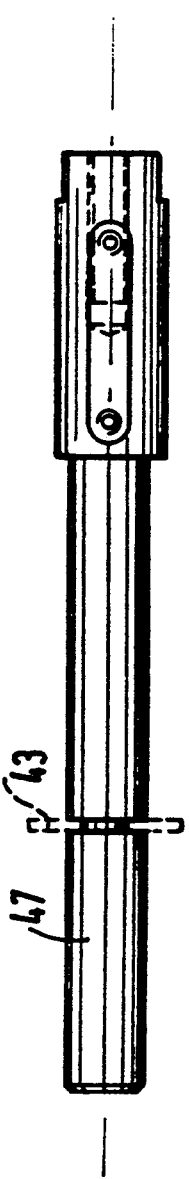

MOTORIZED GEAR SHIFT CONTROL APPARATUS FOR A TRANSMISSION GEARBOX, IN PARTICULAR FOR AUTOMOTIVE VEHICLES

FIELD OF THE INVENTION

The present invention relates to a motorised gear shift control apparatus for use with a transmission gearbox of the kind having fixed gear ratios and a neutral position, and is particularly, though not exclusively, applicable to automotive vehicles.

BACKGROUND OF THE INVENTION

One apparatus of the above kind is described in the specification of French published patent application No. FR 1 497 939A, and consists of an arrangement comprising a first motorised actuator carried by a fixed structure, a linkage which includes at least on the driving or upstream side an input element which is connected to the said first actuator and which is adapted to be driven by the latter; and on the driven or downstream side of the linkage an output element which is coupled to a receptor element. The function of the receptor element is to actuate means for effecting the transition between one gear ratio and another, and/or for selecting a required gear ratio, these transition and/or selecting means being part of the gearbox and constituting the gear shifting means of the latter. The receptor element performs a movement in translation and/or rotation for changing the speed ratios of the gearbox.

Such a motorised control apparatus enables automatic gear shifting to take place in a gearbox of the kind specified above, and has the advantage, in comparison with a conventional manual gear shift system, of reducing the propagation of noises and vibrations, and also of reducing wear. In addition, gear shifting is quicker. However, such an arrangement in its known form does have the drawback that it is relatively bulky, because the actuator drives a disc which is provided with a spiral groove for controlling a receptor lever and for effecting the various gear shifting operations.

Another disadvantage of this known form of automatic gear shifting apparatus is that it is not possible, for example, to shift down directly from fourth gear to second gear, because the profile of the spiral groove prevents such a direct shift taking place. In addition, it is not possible to anticipate a gear shift. Finally, the linkage is relatively complex and is also liable to jamming.

DISCUSSION OF THE INVENTION

An object of the present invention is to overcome the above drawbacks, and thus to provide in a simple and economic manner a novel motorised control apparatus which enables gear shifts to be anticipated, and which also permits rapid changing down of the gears, while at the same time also simplifying the linkage and producing other advantages.

In accordance with the invention, a motorised gear shift control apparatus for a transmission gearbox having fixed gear ratios and a neutral position, the control apparatus being of the kind comprising a first motorised actuator carried by a fixed structure and a linkage comprising at least on the driving or upstream side an input element coupled to the said first actuator so as to be driven by the latter, and on the driven or downstream side an output element coupled to a receptor element for actuating gear shifting means of the gearbox so as to change the transmission gear ratio, is characterised in that: (a) the output element of the linkage is mounted by means of the receptor element for movement in rotation and/or in translation, constituting with the receptor element a moveable unit; (b) the linkage is provided with an actuating means for actuating its output element under the action of the said first actuator; (c) the output element is adapted so that during its displacement it can intercept and/or traverse a camming or ramp means of the apparatus, the ramp means being moveable in a fixed support; and (d) a second motorised actuator, carried by a fixed structure is coupled to the ramp means for displacing the said ramp means in a discrete stepwise manner.

During a gear shifting operation, the invention enables the output element to perform a continuous movement by passing through a position corresponding to the neutral state of the gearbox, and the said ramp means are able to be displaced by the second actuator before the output element passes through the position corresponding to the neutral state by the traversing and/or intercepting the ramp means.

It is thus possible to anticipate gear shifts by displacing the ramp means in advance, while in addition, the provision of the latter itself reduces the size of the apparatus Preferably, the apparatus includes control means for the first and second actuators, arranged to operate in such a way that the ramp means are displaced before the first actuator is energised.

It will be appreciated that it is thus possible to increase the number of levels of selection (i.e. the number of combinations of speed ratios between which a shift can be directly made, up or down), without any significant modifications.

In addition, the linkage of the apparatus is simplified and is less vulnerable to wear and jamming effects, while gear shifting operations are able to be carried out more quickly than in the apparatus of the prior art.

Furthermore, snatching effects are minimised because selection, as defined above, or simple transition between one gear ratio and another, as the case may be, is carried out by interception between the output member of the linkage and the ramp means.

Preferably, anticipation of a gear shift operation is effected by the apparatus during the time taken for the associated declutching operation.

In accordance with a major feature of the invention, the actuating means of the linkage includes a deformable intermediate element having an energy accumulator. This arrangement enables the synchronisation or shaft speed matching phase in a synchromesh gearbox, which involves a temporary arrest of the movement during a gear shifting operation, to be carried out smoothly.

In accordance with another feature of the invention, the output element of the linkage is in two parts, and the linkage is in the form of a cardan mechanism. This arrangement enables the translational and/or rotational movements of the output element to be carried out satisfactorily, with minimal resistive forces.

In accordance with a further feature of the invention, the ramp means include cams which are mounted in opposition to each other, and which are preferably moveable transversely against the action of resilient means or damping springs of predetermined stiffness. This enables shocks between the cams and the output lever to be damped out, the parameters of these damping springs being determined accordingly. In addition, the mobility of the cams, thereby provided, facilitates both selection and transition between different gear ratios. In general, this arrangement ensures that the receptor element will be able to carry out the correct translational and/or rotational movements.

In accordance with yet another feature of the invention, the output element includes an end portion in the form of a lozenge, adapted to cooperate with the cams, the cross section of the said end portion being in the form of a trapezoid or trapezium. This combination enables both noise and wear to be reduced even more, by providing a contact plane between the output element and the cams.

It is however also of course possible to reverse the arrangement, so that it is the lever that carries the cams and the ramp means the lozenge; and it should be understood that this alternative arrangement is included in the scope of the invention.

For maneuvering the control apparatus, sensors are associated respectively with the first actuator and with the second actuator, and also with the intermediate element of the linkage. These sensors transmit signals to a central electronic processing and control unit, which (like the sensors themselves) forms part of the apparatus and which governs the operation of the actuators.

The sensor associated with the intermediate element enables the first actuator to be arrested after it has moved through the total predetermined travel necessary for changing the speed ratio during the shaft speed synchronization and subsequent gear engaging operations. The sensor of the intermediate element detects that the latter has reverted to its initial position, after a time delay for safety purposes, and therefore that the appropriate dog clutch in the gearbox has been engaged.

The first actuator thus carries out a continuous movement, ignoring the arrest of the mechanism during shaft speed synchronization, by virtue of the deformation of the intermediate element of the transmission. This actuator therefore performs the travel, necessary for engaging a new gear ratio, in advance of the engaging operation.

Several preferred embodiments of the invention will be described in detail below, by way of example only and with reference to the accompanying drawings.

BRIEF DESCRIPTION OF THE DRAWINGS

FIG. 4 is a diagrammatic perspective view showing the ramp means and the output element of the linkage, with its receptor element, in a first embodiment of the invention.

FIG. 5 is a partial view showing the end of the receptor element associated with control sliders of the gearbox.

FIG. 6 is a view showing the rear of the gearbox with the control linkage, in accordance with a second embodiment of the invention.

FIG. 7 is a partial view showing the sensor associated with the intermediate element of the transmission.

FIG. 8 is a view as seen in the direction of the arrow 8 in FIG. 7.

FIG. 9 is a bottom plan view as seen in the direction of the arrow 9 in FIG. 6.

FIG. 13 is a view in axial cross section, showing the intermediate element of the linkage.

FIGS. 14 and 15 are views in axial cross section showing certain components of the intermediate element of the linkage.

FIG. 16 is a view of a spindle which is part of the intermediate element of the linkage

DESCRIPTION OF PREFERRED EMBODIMENTS OF THE INVENTION

Figure 1:
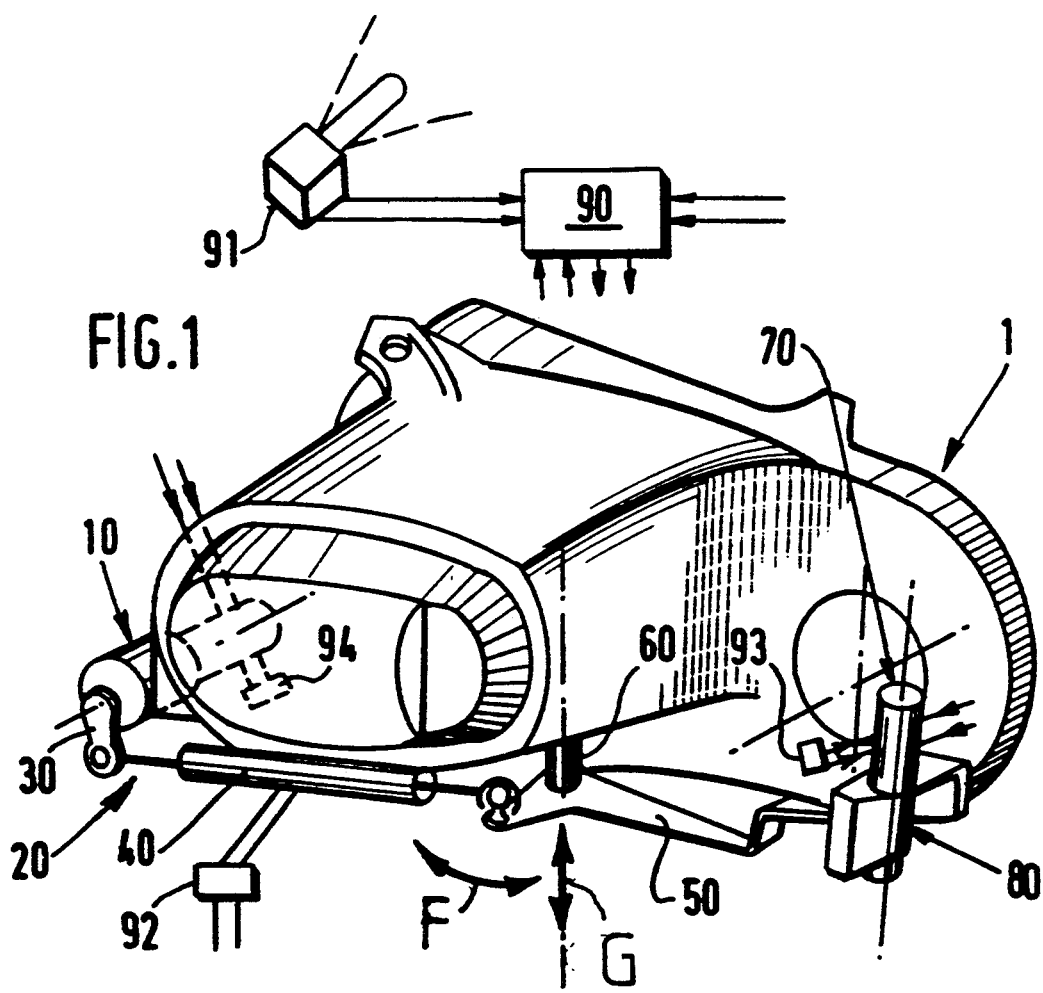
FIG. 1 is a diagrammatic perspective view of a gearbox showing the gear shift control apparatus in accordance with the invention.

FIG. 1 is a general outline view showing the general outline of a synchromesh gearbox for an automotive vehicle, of the kind that gives stepped speed ratios and a neutral position. This gearbox has gear shifting means which include transition means and selection means for changing the transmission speed ratio. In this example, the gearbox is a five-speed gearbox. Its gear change positions are shown on the grid in FIG. 2, in which the neutral position is represented by the line PM and the reverse position is indicated at AR. Transition from, for example first gear to second gear is obtained by means of the transition means, while a change between, for example, second and fourth gears is obtained using the selection means. The terms "transition" and "selection", as used herein, are to be construed accordingly.

The control apparatus includes a first motorised actuator 10 carried by a fixed part of the system, and a linkage 20. The latter comprises, on the upstream or driving side of the linkage, an input element 30 which is coupled to the actuator 10, so as to be driven by the latter. On its driven or downstream side, the linkage includes an output element 50, which is coupled to a receptor element 60 for actuating the gear shifting means in the gearbox, i.e. the transition means and/or the selection means mentioned above.

The output element 50 of the linkage 20 is mounted in the gearbox casing by means of the receptor element 60, in such a way that it can be moved relative to the casing in translational movement and/or rotary movement, with the output element 50 and the receptor element 60 together constituting a moveable or easily transportable unit. The linkage 20 includes an actuating means in the form of an intermediate element diagrammatically indicated at 40, controlled by the input element 30 for actuating its output element 50 in response to the action of the first actuator 10.

Figure 3:
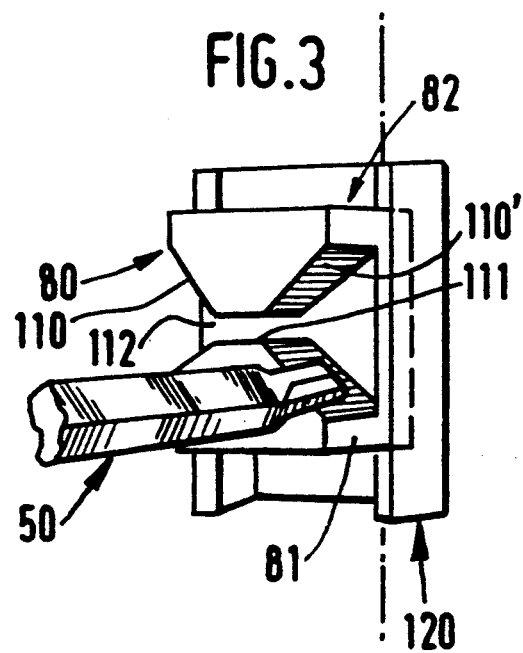
FIG. 3 is a partial perspective view showing the ramp means in accordance with the invention, together with the associated end of the output element of the linkage of the apparatus.

Referring in particular to FIG. 3, when the output element 50 is displaced it intercepts and/or passes through a moveable camming or ramp means 80 carried by a fixed support member 120. The ramp means 80 is coupled with a second motorised actuator 70, which like the first actuator 10 is carried by a fixed part of the system. The actuator 70 is arranged to displace the ramp means 80 in a discrete manner.

The word "discrete" is to be taken to means, in this context, that the ramp means 80 are able to occupy selectively a number of distinct, stable positions. Similarly the verb to "traverse" is used here to mean that the element 50 is able to pass from one side to the other of the ramp means 80 without actually coming into contact with the latter, whereas in the course of an "interception" it does make contact with the ramp means, while still passing from one side of the latter to the other.

The actuation of the output element 50 by the actuating means of the linkage causes it to undergo a displacement in rotation or in translational movement. Accordingly, during a gear shift operation, the output element 50 is able to carry out a continuous movement, passing through the position corresponding to the neutral mode of the gearbox, and the ramp means 50 are able to be displaced by an advancing movement of the second actuator 70 (which in this case acts as the actuator for selection purposes) before the output element 50 passes through the position corresponding to neutral by traversing and/or by intercepting the ramp means.

Preferably, the ramp means 80 are in fact moved before the first actuator 10 is energised. In this case the actuator 10 acts as the actuator for transistion purposes. More precisely, in this example, and referring to FIGS. 3, 4 and 32, the ramp means 80 include two cams 81 mounted in opposed relationship to each other in the direction in which they are selectively moved by the actuator 70. The cams 81 are spaced apart from each other, so as to define a traverse slot 112. This slot is designed according to particular applications, having regard to the dimensions of the output element 50 which is to pass through it.

The cams 81 are formed in a body member 82 in the form of a block, which in this example is mounted in the fixed support member 120, for linear sliding movement in the latter as can be seen from FIG. 3. This movement causes the output element 50 to rotate. The cross section of each cam 81 is generally in the form of a trapezium, having two symmetrical portions 110, 110', which are inclined in opposite directions to each other and which are joined by a flat central portion 111.

In FIG. 1, the output element 50 is in the form of a single control lever. For actuating this lever, the intermediate element 40 of the linkage 20 is articulated at one of its ends on the input element 30, and is coupled with the control lever 50 at its other end. The lever 50 is secured to the receptor element 60, which in this example is the gear shift control rod of the gearbox. The control rod 60 carries at least one control finger 61 (see FIG. 4), and is part of the transmission and/or selection means of the gearbox, so that it thus also forms part of the gear shifting means of the gearbox. To this end, the spindle 60 is generally in the form of a carpenter's clamp, and is moveable in translation, i.e. axially, and/or in rotation, as indicated respectively by the arrows Y and X in FIG. 4.

The control finger 61 (FIGS. 4 and 5) is arranged to cooperate with control sliders 63, each of which is associated with a shaft speed synchronising cone clutch (not shown) in the gearbox. The control sliders 63 have grooves 64 for cooperation with the rounded end 62 of the finger 61, there being a clearance X2 with definition of a neutral zone. In the neutral position, the control finger 61 is able to move in translational movement from one groove 64 to another, while during transition from first gear to second gear, for example, the finger 61 is caused to rotate in the arc of a circle.

In this example, for simplicity, only three control sliders 63 are shown, with their grooves 64 aligned with each other in the neutral position. Also in this example, transition between one gear ratio and another is effected by rotation of the rod 60, i.e. as indicated by the arrow F in FIG. 1, while selection of different gear ratios is obtained by straight line or translational movement of the rod 60 as indicated by the arrow G in FIG. 1.

Figure 2:
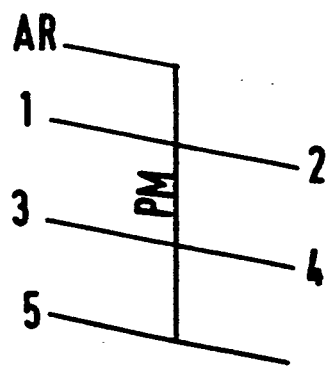
FIG. 2 is a diagrammatic view of a gear shift position grid.

However, the opposite arrangement is of course possible, with transition between successive gear ratios being obtained by translational movement of the rod 60, while selection (in the sense described above) is obtained by rotation of the rod 60. In that case, the grid shown in FIG. 2 is rotated through 90 degrees, and the cams 81 and cam body member 82 perform a rotational movement in the arc of a circle, in a discrete sense as defined above. In this case also, it is the first actuator 10 that moves the rod 60 axially, and the orientation of the control sliders 63 is changed by 90 degrees, the same being true for the cams 81 of FIG. 4.

Reference is invited to the specification of French published patent application No. FR 2 609 138A for greater detail as to the synchromesh mechanism mentioned above. However, it should be mentioned here that during the synchronizing operation, movement of the synchronizing mechanism is prevented by the synchronizing cones until the shaft speeds have been synchronized, while the coupling between the appropriate gear wheels, to complete the gear shift, takes place afterwards. The above mentioned specification also shows, diagrammatically, the gear wheels and shafts of a gearbox of the kind concerned. Its input or primary shaft is driven in rotation by a friction disc which is coupled in rotation to that shaft by means of a splined coupling.

The friction disc has liners which are adapted to be gripped between a reaction plate and a pressure plate of the kind conventionally forming part of a clutch, these plates being coupled for rotation with the crankshaft of the engine. The gripping of the friction disc liners between the reaction plate and pressure plate is obtained through resilient means such as a diaphragm, which bears against a cover member secured for rotation with the pressure plate. Disengagement of the clutch (i.e. release of the friction disc) is obtained by means of a clutch release bearing acting on the diaphragm, and the clutch release bearing is actuated by means of a declutching fork. The latter may be controlled by a jack-type declutching actuator, as described in the specification of French published patent application No. FR 2 609 138A; in a modification, it may be part of an actuator having an electric motor, reducer and compensator spring, all mounted in a common housing in the manner described in the issue for October 1984 of the periodical "Ingénieurs de l' Automobile".

It will be noted that the control rod 60 is guided for axial and rotational movement by bushes 65 carried by the gearbox 1. The bushes 65 are coaxial with the rod 60 so that the latter is free to move both axially and in rotation in both directions (see FIG. 4) with respect to its own axis.

Figure 10:
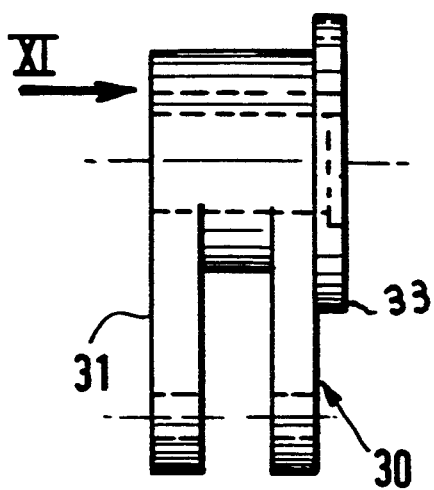
FIG. 10 is a side view showing the input element of the linkage.
Figure 11:
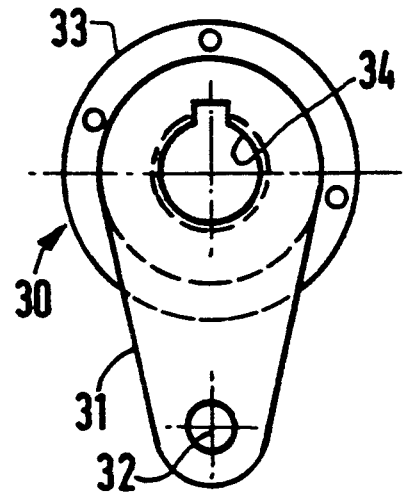
FIG. 11 is a view as seen in the dirction of the arrow 11 in FIG. 10.
Figure 12:
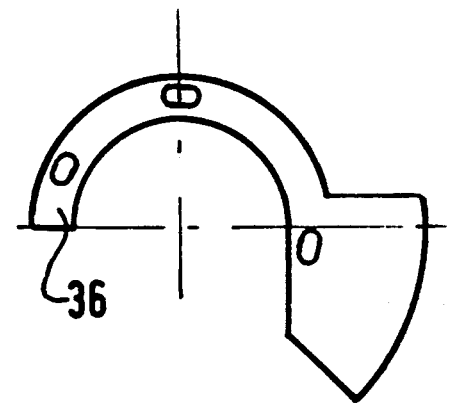
FIG. 12 is a view showing a detection plate associated with the input element.

The input element 30 is shown in FIGS. 10 and 11, and is in the form of a double crank having two arms 31 and a flange 33, with a through hole 34 extending through the cylindrical bridging portion of the crank from which the arms 31 extend transversely. The hole 34 is provided with a keyway for accommodating a key. Each arm 31 has a hole 32, with the holes 32 being aligned with each other so as to accommodate a dowel, visible in FIG. 9. A detection plate 36, shown in FIG. 12, is carried by the flange 33 of the crank element 30. The plate 36 is adjustable circumferentially by means of the holes formed in it and shown in FIG. 12. The transition actuator 10 has an output or driving member, not shown, which carries a key cooperating with the groove of the hole 34 in the crank element 30, so that the latter is rotated by the driving element of the actuator 10. The crank element 30 is also secured axially to the driving member of the actuator 10.

Reference is now made to FIGS. 13 to 16, which show the intermediate element 40 of the linkage 20. The element 40 is deformable, and includes an energy accumulator 44, the purpose of which is to prevent any damage during the operation of synchronising the appropriate gear wheels, and to enable the actuator 10 to operate in continuous movement.

In greater detail, the intermediate element 40 has a spherical socket connector 48 at one end, for articulation with the input element 30. The socket connector 48 lies between the two arms 31 of the latter (FIG. 10) and is coupled to them by means of the above mentioned dowel seen in FIG. 9, which is fitted in the holes 32 of the arms 31. The connector 48 is fixed to a spindle 47 which is moveable in the body of the intermediate element 40. This body comprises two cylindrical body members 42 and 46, each having coaxial internal bore. The body members 42 and 46 are joined to each other through teeth formed on the member 46 and engaging in an annular groove formed in the member 42. The element 40 thus comprises two members 42 and 46, 47 respectively, which are in a piston-and-cylinder relationship with each other. The spindle, or piston, 47 is prevented from rotating in the body 42, 46 by means of a projection of the spindle 47 which engages in a groove 49 formed in the body member 46.

Relative movement between the spindle 47 and the body 42, 46 is effected against the action of the energy accumulator 44, which in this example is a compression spring and which is accommodated axially in the body so as to bear between the latter and the spindle 47. For this purpose, the spindle 47 has two different diameters defining a shoulder between them, and carries on the portion having the smaller diameter a thrust ring 43. The body member 46 is also shouldered. The spring 44 extends axially around the spindle 47 between two rings 45 which are spaced apart axially, with one of them engaged against the shoulder formed in the body member 46 and the other ring 45 bearing on the free end of the body member 42. The rings 45 are interposed between the thrust ring 43 and the shoulder formed in the spindle 47.

The distance between the thrust ring 43, which is mounted for sliding movement in the internal bore of the body member 42, and the shoulder of the spindle 47, corresponds to the distance between the two rings 45 with the compression coil spring 44 mounted under precompression between them. The thrust ring 43 enables the spindle 47 to be axially engaged with the rings 45 and with the spring 44. Thus for a predetermined force, the spring 44 is caused to become compressed between the rings 45 during the synchronising operation of the appropriate gears, with the spindle 47 becoming displaced axially with respect to the cylindrical body 42, 46, against the force exerted by the spring 44. The spring 44 then expands again, once the shaft speeds of the gears concerned have been synchronised, to enable the gears to be actually engaged. The axial movement of the spindle 47 is subsequently converted into rotational movement of the control 60 and of the output element 50.

Thus, in FIG. 4, the intermediate element 50 is adapted to actuate a T-shaped lever which is fixed to the control lever or output element 50 by its vertical part, being articulated on to the casing of the gearbox through one of its wings, while the other wing is coupled with the intermediate element 40.

Figure 17:
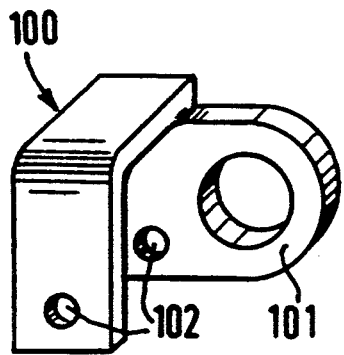
FIG. 17 is a perspective view of a support hanger for the intermediate element of the linkage.

In FIGS. 6 to 13, the body member 42 carries a rotary connector 41, which is coupled with the output element 50, and the intermediate element 40 is articulated on to a carrier yoke 103 which is carried by a support hanger 100. The hanger 100 is mounted on a fixed part of the system. The support hanger 100 is shown in FIG. 17, and is generally U-shaped, having branches which are formed with holes 102 for the pivoted mounting of the central branch of the carrier yoke 103. The latter is shown in detail in FIGS. 18 and 19. The central branch of the carrier yoke 103 preferably itself has a spherical bearing, and is inserted into the support hanger 100 with a pivot pin 104 (FIG. 20) extending through the holes 102 and through the spherical bearing of the yoke 103. One of the branches of the support hanger 100 has an ear 101 which extends as a lateral extension of one branch of the hanger for securing the latter to the gearbox casing by means of a threaded stud, as shown in FIG. 6.

Figure 19:
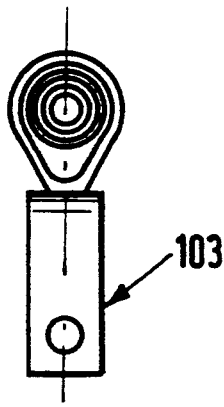
FIGS. 18 and 19 are respectively a side view and a front view, showing the carrier yoke for the intermediate element of the linkage, this carrier yoke being associated with the support hanger shown in FIG. 17.
Figure 18:
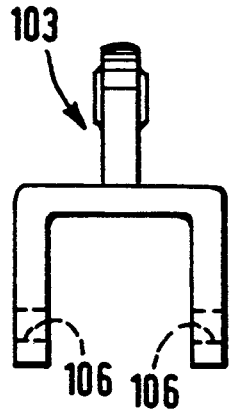
Figure 20:
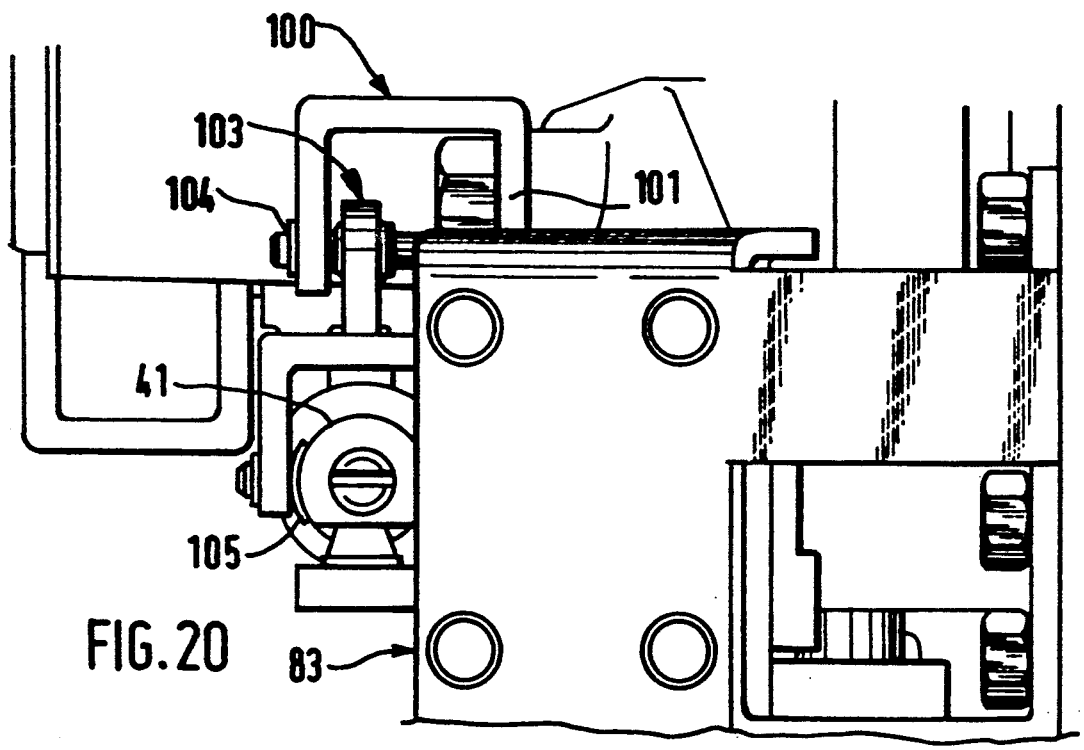
FIG. 20 is a view as seen in the direction of the arrow 20 in FIG. 6.

Reverting to FIGS. 18 to 20, the carrier yoke 103 has a U-shaped lower portion, the arms of which have aligned holes 106. The rotary connector 41 of the intermediate element, shown in FIG. 13, has a cylindrical outer surface which is mounted between two cradle elements 105, FIG. 20, which are diametrically opposed to each other and each of which is in the form of an annular sector. Each of these cradle elements is carried by the carrier yoke 19, by means of the holes 106.

The actuator 10 is preferably secured to the gearbox casing, so that the input element 30, the intermediate element 40 and the carrier yoke 103 together define the three sides of a deformable parallelogram, thereby constituting an arrangement which enables the output element 50 to be moved in rotary movement in response to the actuator 10. In a modified arrangement, this rotary movement may be obtained using a meshing device which is driven by the first actuator 10, having a gear wheel in two parts, which are moveable with respect to each other against a spiral spring which is loaded like the spring 44 in FIG. 13.

In the embodiment shown in FIG. 6, the output element 50 comprises two levers 57 and 51, which are articulated to each other and coupled with the intermediate element 40 through a spherical joint, so as to constitute a cardan-type linkage. In this connection reference is especially made to FIGS. 21 to 26. The lever 51 has at one of its ends a head 52 having a spherical terminal portion, for mounting in the connector 41 of the intermediate element 40. The other end 53 of the lever 51 is of increased thickness and has a through hole 54.

Figure 21:
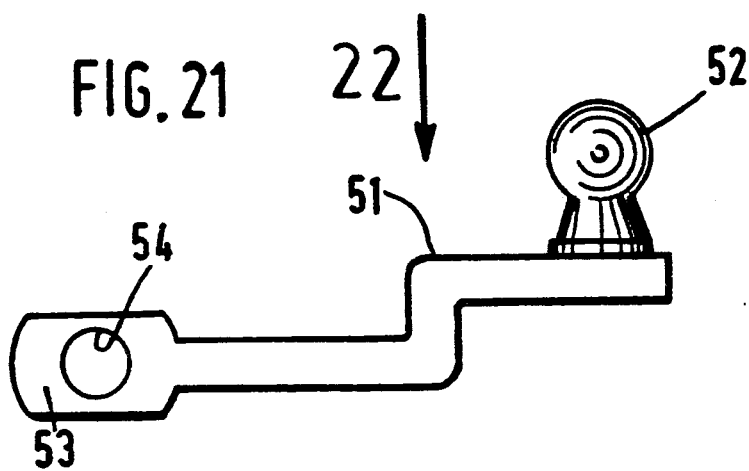
FIG. 21 shows a transition lever which is part of the output element of the linkage.
Figure 22:
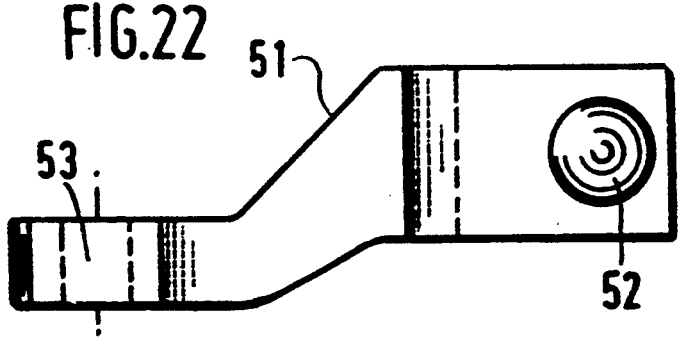
FIG. 22 is a view as seen in the direction of the arrow 22 in FIG. 21.
Figure 23:
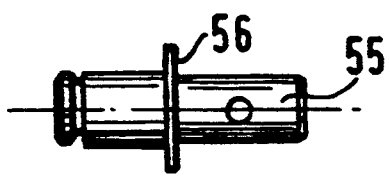
FIG. 23 shows a pivot pin associated with the transition lever of the output element of the linkage.
Figure 24:
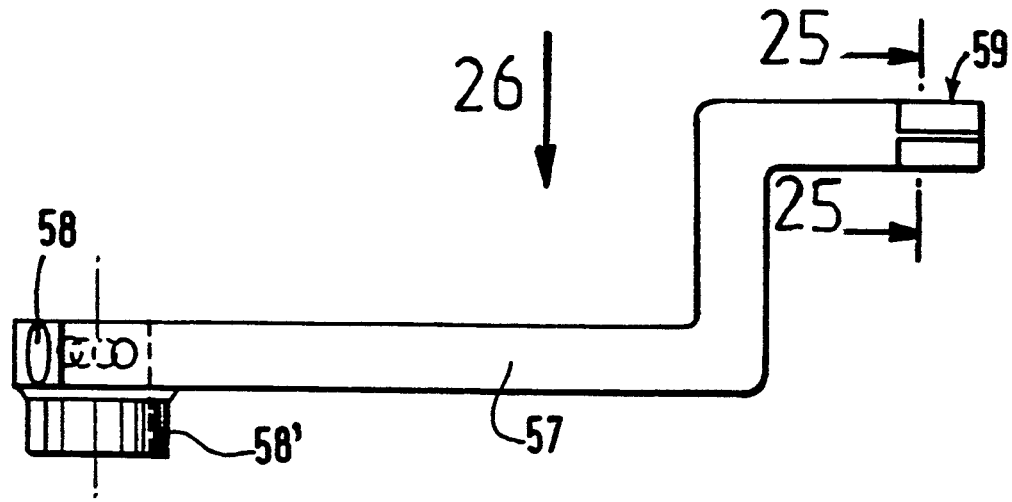
FIG. 24 shows a selection lever which is also part of the output element of the linkage.

The lever 51 is cranked, as can be seen in FIGS. 21 and 22, and a pivot pin 55 (FIG. 23), having a stop ring 56, is designed to fit in this hole 54, with the ring 56 abutting against the lever 51 and overlapping the hole 54, so as to locate the pivot pin 55 axially with respect to the lever 51. For this purpose the pivot pin 55 has a groove in which a circlip is fitted (see FIG. 9). The pivot pin 55 is also formed with a hole through which a cotter pin, described below, is inserted.

The pivot pin 55 itself is engaged in a hole 58 which is formed in one of the ends of the second lever 57. The lever 57 is shown more particularly in FIGS. 24 to 26. The end of the lever 57 having the hole 58 carries a guide bush 58' which is welded on to the lever 57. The bush 58' is bored like the corresponding part of the lever 57, for mounting on the control rod 60 and for coupling with the latter, for example by means of a cotter pin (the holes for the cotter pin are visible in FIGS. 24 and 26). Like the lever 51, the lever 57 is cranked, which gives it a certain amount of elasticity and raises the level at which its other end portion 59 lies, as can be seen in the assembled condition in FIG. 6. This end portion 59 is in the form of a lozenge in cross section, with the points of the lozenge being rounded, as can be seen in FIG. 25.

Figure 25:
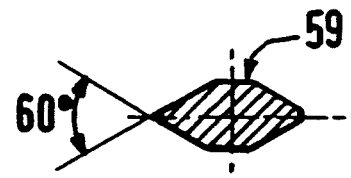
FIG. 25 is a view in cross section, taken on the line 25—25 in FIG. 24.
Figure 26:
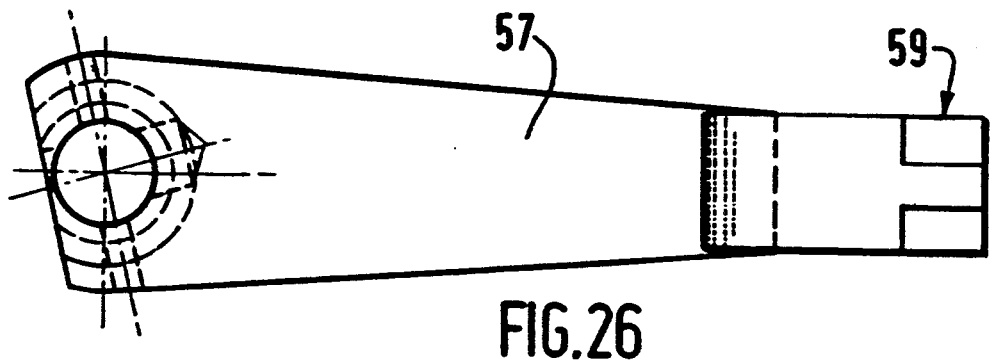
FIG. 26 is a view as seen in the direction of the arrow 26 in FIG. 24.
Figure 31:
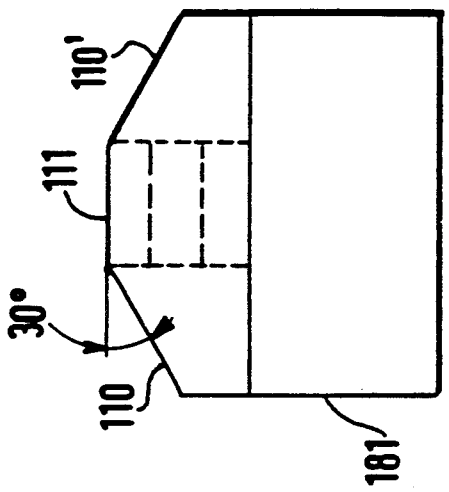
FIG. 31 is a view as seen in the direction of the arrow 31 in FIG. 30.

The end portion 59 of the lever 57 cooperates with the cams of the ramp means, by engagement of the inclined portions of the lozenge, FIG. 25, with the inclined portions 110 and 110' of the cams (e.g. cams 81 as in FIG. 3), while the flat surfaces of the end portion 59 cooperate with the central portions 111 of the cams. The contact zones between the output element 50 and the cams of the ramp means are thus maximised, which leads to reduction in impact noise, and in particular to a reduction in wear of the central cam surfaces 111. As in the arrangement shown in FIG. 3, the cams are monobloc with the body member 82. However, as is shown in particular in FIGS. 27 to 37, the cams, here indicated by the reference numeral 181, are moveable against the action of resilient means in the form of springs 87. These springs are of such stiffness as to reduce the shocks accompanying movement of the cam member 82, 181.

It will be appreciated that the mobility of the cams enables the end portion 59 of the output member 50 to move in a straight line during a gear ratio selection operation. Thus, having regard to the clearance X2 (already mentioned in connection with FIG. 5), the end 62 of the central finger 61 will always pass from one of the grooves 64 of the control sliders 63 to another with complete certainty.

Figure 28:
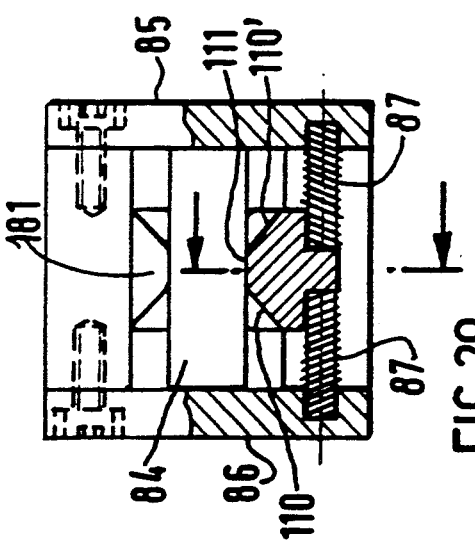
FIG. 28 is a view in partial cross section, taken on the line 28—28 in FIG. 27.
Figure 30:
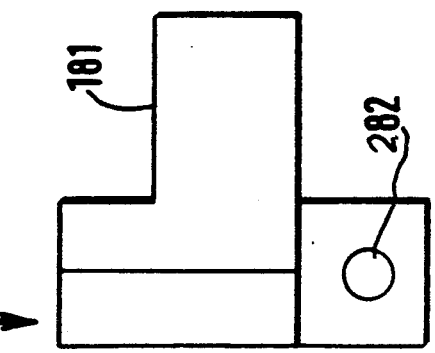
FIG. 30 is a view of one of the cams which are incorporated in the ramp means, in a third embodiment of the invention.
Figure 27:
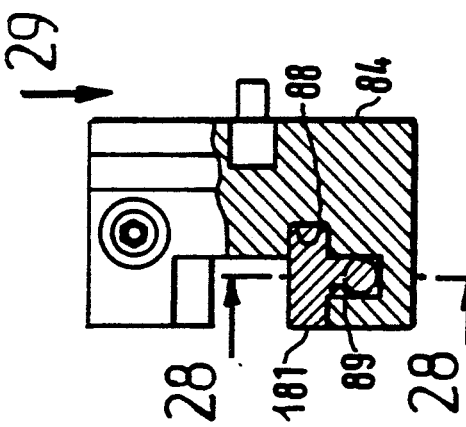
FIG. 27 is a view of the ramp means in the second embodiment of the invention, seen in partial cross section taken on the line 27—27 in FIG. 28.
Figure 29:
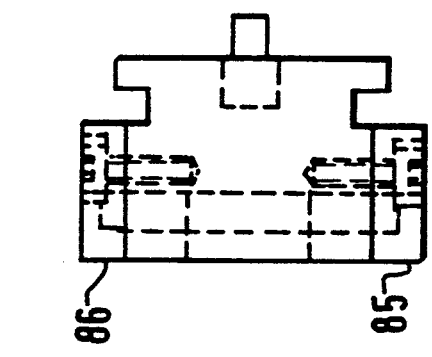
FIG. 29 is a view as seen in the direction of the arrow 29 in FIG. 27.
Figure 34:
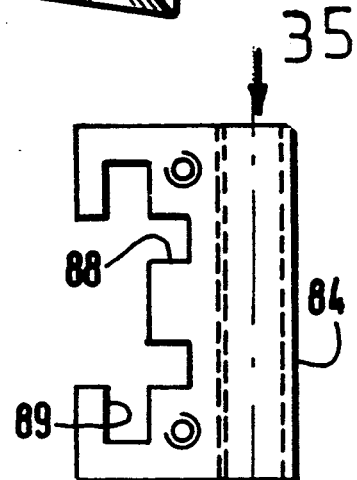
FIG. 34 shows a cam-carrying core member of the ramp means.

In FIGS. 27 to 37, the U-shaped cam body member, 182, includes a cam-carrying core member 84 (shown by itself in FIG. 34). The member 84 has longitudinal grooves 88 and 89, which are closed laterally by means of closure plates 85 and 86 respectively. The closure plates 85 and 86 are similar to each other, the plate 85 being shown by itself in FIG. 36. The plates 85 and 86 are fixed to the core member 84, in this example by means of screws as shown in FIGS. 28 and 29. The plates 85 and 86 are bevelled and include recesses for accommodating the ends of the coil springs 87.

Each cam 181 (see FIG. 27) is T-shaped in cross section, comprising a vertical portion which is engaged in a groove 89 formed in the core member 84, with the wings which form the transverse part of the T being respectively in contact with the core member 84 and engaged in a groove 88 which is also formed in the latter. In the interests of symmetry, the core member 84 has two grooves 88 and two grooves 89 (see FIG. 34).

The springs 87 are arranged on either side of the cam 181 concerned, and bear against the vertical portion of the latter which lies in the groove 89. The core member 84, FIG. 29, has two lateral grooves in its base for cooperating with complementary projections of the fixed support member 120 (FIG. 32, corresponding in function to the member 120 in FIG. 3). With this arrangement, the core member 84 is able to be displaced in straight line translational movement, in which it is guided by the fixed support member 120. In the preferred arrangement shown in FIGS. 35 to 37, a dovetail type assembly is used in place of the rectangular grooves of FIG. 29.

In addition, in order to prevent the springs 87 from escaping, a bar 130 is preferably fitted inside the springs, passing through the cam 181 by way of a hole 282 (FIG. 30) formed through the tail portion of the cam.

Figure 32:
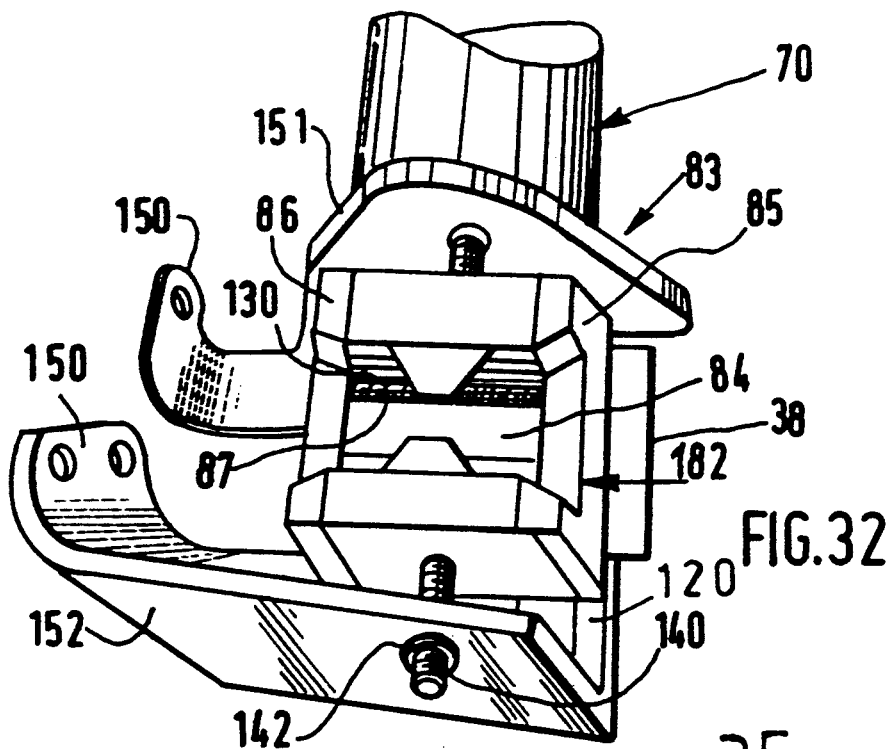
FIG. 32 is a partial view, seen in perspective, showing the ramp means and their support in a fourth embodiment of the invention.
Figure 36:
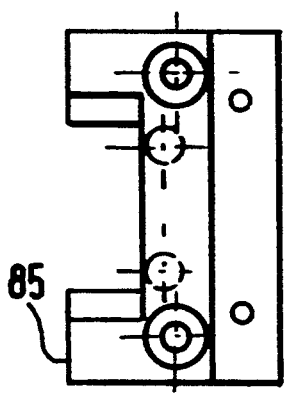
FIG. 36 is a view of one of two closure plates of the ramp means.
Figure 33:
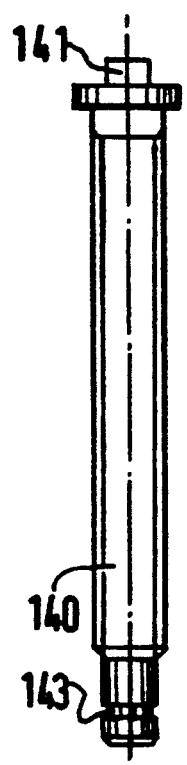
FIG. 33 shows an actuating or lead screw for the ramp means.
Figure 35:
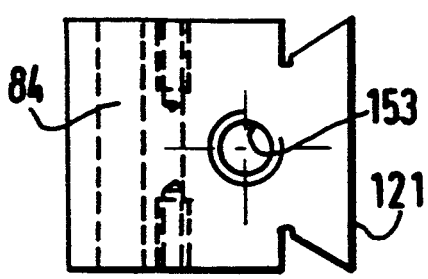
FIG. 35 is a view as seen in the direction of the arrow 35 in FIG. 34.
Figure 37:
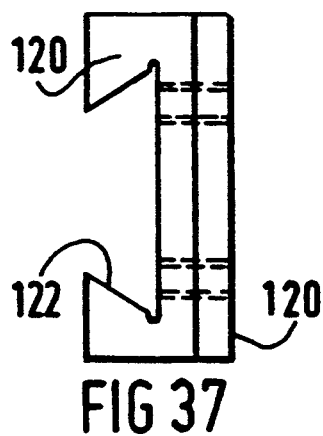
FIG. 37 is seen in the same direction as FIG. 35, and shows complementary support and guide means associated with the ramp means.

Reference is now made to FIG. 33 as well as FIG. 32. The support member 120 is secured to a mounting member 83, FIGS. 9 and 32, for example by means of screws, with threaded holes being provided for this purpose in the support member 120 as shown in FIG. 35. The mounting member 83 is provided with fastening ears 150, for fastening it to the gearbox, and has portions 151 and 152 through which a drive or lead screw 140 passes. The second actuator 70 is secured to the portion 151 of the mounting member 83, for example by means of screws. The output or driven element of the actuator 70 is thus arranged to move the head 141 of the drive screw 140. The other end 143 of the drive screw 140 extends through the portion 152 of the mounting member 83, and has a circumferential groove on which a locating ring 142 is fitted. The drive screw 140 cooperates with a threaded bore 153 in the cam-carrying core member 84. The various elements 70, 182, 120, 83 and 140 thus constitute a single unit which is readily handled and transported, with the core member 84 being fitted axially between the portions 151 and 152 of the mounting member, but with a clearance.

The first actuator 10 and the second actuator 70 may be of the same kind as that which is described in the specification, mentioned above, of French published patent application No. FR 1 497 939A, with an electric motor and a gear type drive device. In this example, they are carried by the gearbox casing. This enables the number of rotations performed by the electric motors of the actuators to be counted, using sensors 94 and 93 (FIG. 1), which are associated with the actuator 10 and the actuator 70 respectively. The sensors transmit signal to a central, electronic, processing and control unit 90, which forms part of the apparatus and the purpose of which is to control the actuators 10 and 70.

Associated with the intermediate element 40 is a further sensor 92. This is a Hall effect sensor that includes a screen 35, FIG. 8, which is fixed to the spindle 47 and traverses the groove 49, FIG. 13. The sensor 92 also has a fork 94, which is carried by the body 42, 46 and is so disposed that it can be traversed by the screen 35, FIGS. 7 and 8. The sensor 92 detects movements within the intermediate element 40, and transmits signals accordingly to the processing and control unit 90, FIG. 1.

Figure 39:
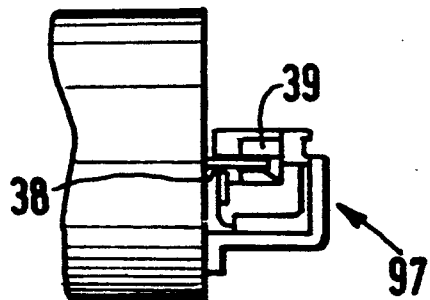
FIGS. 38 and 39 are views similar to FIG. 8, showing Hall effect sensors associated respectively with the input element and with the cam-carrying core member.
Figure 38:
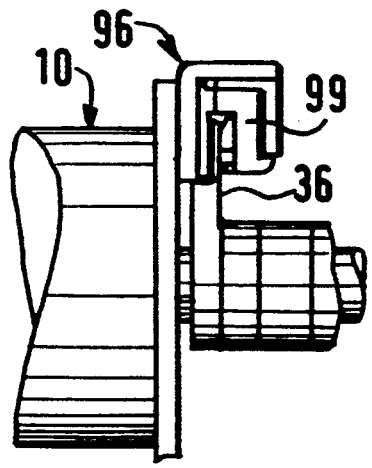

With reference now to FIGS. 38 and 39, these show further Hall effect sensors 96 and 97, which, in the interests of simplicity, are not shown in the other Figures. The sensor 96 is associated with the input element 30, FIG. 1, and the sensor 97 with the fixed support member 120, FIG. 3 or FIG. 32. The detection plate 36 shown in FIG. 12 is part of the sensor 96, as is a fork 99 (FIG. 38), in the same way as described above in respect of the Hall effect sensor 92 with reference to FIG. 8.

The Hall effect sensor 97 includes a plate 38 shown in FIG. 32, which is fixed to the core member 84. It also includes a fork 39, FIG. 39, which is fixed to the support member 120. These sensors 96 and 97 are triggering sensors, and detect which gear ratio is currently selected, in particular when the vehicle is at a standstill. The sensors 93 and 94, on the other hand, operate incrementally. It is thus possible to position the control finger 61, and to position the actuators 10 and 70 in a well-defined neutral position.

Thus, using the sensor 94, the motor of the actuator 10 can be rotated so that the linkage 20 will carry out a predetermined movement corresponding to the travel necessary for performing a gear shift, and the motor can then be stopped for a safety period sufficient to ensure that synchronization has taken place. The sensor 92 detects the movement of the plate 35 when the spring 44 relaxes, and gives an appropriate command to the unit 90 for stopping the actuator 10, again with a time delay for safety. It is thus possible to be confident that the actual engagement of the required gear ratio is effected without any detrimental reaction forces being set up in the linkage 20 and in the actuator 10.

The processing and control unit 90 receives the signals from a gear shift controller 91, FIG. 1, which is operated by the driver. This controller 91 replaces the usual manual gear shift lever, and may for example comprise a pulse-type gear shift controller, as used in top-of-the-range vehicles for radio tuning purposes. Thus, by moving the joystick of the controller 91 towards the left (as seen in FIG. 1) it is possible to transmit successive pulses corresponding to a command for a gear shift involving an upward transition of speed ratios, while by moving the joystick to the right in FIG. 1, successive pulses are transmitted corresponding to a command for downward transition between speed ratios.

All of the various embodiments described above operate in the following way.

Using the gear shift controller 91, the driver sends a command to the processing and control unit 90 which controls starting of the actuator 10, which then operates the input element 30 and intermediate element 40 so as to cause the lever 50 to move in rotation. In the case where only one transition is required (e.g. from first to second gear, or from third to fourth gear, reverse gear or vice versa), the lever 50 is rotated by the intermediate element 40 and the control rod 60, with the control sliders 63 then effecting a translational movement. Movement of the actuator 10 is arrested at the end of a given number of rotations, in response to signals transmitted by the sensor 94 to the control unit 90. During this phase the lever 50 traverses the canal 112 of the ramp means 80, which remain stationary.

Now if it is required to change from second to third gear, the actuator 10 is started as before, but preferably during the declutching operation an anticipatory translational movement of the ramp means 80 is carried out, before the actuator 10 has been started. The control unit 90 then transmits a starting signal to the second actuator 70, causing the lever 57 to pivot so that the latter will intercept the appropriate cam 81 in a position corresponding to the neutral position of the finger 61 during its rotational movement. The lever 57 also performs a translational movement which is damped and gentle, by cooperation between its end portion 59 and the cam portions 110' and 111, and the control rod 60 then moves axially (corresponding to Y2 in FIG. 5) so that the finger 61 passes from one control slider 63 to the other via the grooves 64, with the sliders in the position corresponding to the neutral mode of the transmission. The appropriate control slider 63 is subsequently moved in translation, with the lever 57 passing from one side of the cam means to the other. The movement of the actuator 70 is arrested after a given number of rotations, detected by the sensor 93, have been performed.

If it is required to pass from third gear to second gear, the lever 50 is rotated in the opposite direction, and cooperates with the face 110 of the other cam 81. It is of course also possible to pass directly from fourth gear into second gear.

As will be understood from the foregoing, the lower cam enables a selection movement to higher gears to be performed, while the upper cam similarly enables a selection movement to lower gears to be carried out.

Translational or straight line movement of the ramp means 80 is of course determined in accordance with particular applications, having regard to the distance which must be travelled by the finger 61 in order to pass from one control slider 63 to another.

During the synchronisation of the gear wheels in the gearbox, the intermediate element 40 is contracted, after which it once again extends in order to carry out the actual engagement of the gears, all under surveillance by the sensors 92 and 94.

It will be clear from the foregoing description and from the drawings that, using the control apparatus in accordance with the present invention, the profile of the gearbox casing can be closely espoused by the physical arrangement of the apparatus, with the intermediate element 40 being arranged at the level of the lower part of the gearbox (see FIGS. 1, 6 and 9). The apparatus also lends itself well to use with a clutch of the kind described in the French patent specification No. FR 2 609 138A and the "Ingénieurs de l'Automobile" article, both mentioned above, displacement of the ramp means 80 being effected during the operation of disengaging or engaging the clutch, so that the action of the apparatus is itself extremely fast.

The two actuators 10 and 70 are arranged perpendicularly in the embodiments described, but other positions are also possible.

The present invention is of course not limited to the embodiments described above. In particular, the sensors 93 and 94 may be in the form of potentiometers. Also, a push button or the like may be used in place of the joystick-type gear shift controller 91. The actuators may be of the hydraulic motor type instead of having electric motors.

It is of course possible to invert the structures described, for example by making the lozenge-shaped end portion 59 part of the ramp means 80, while the lever 50 may itself carry the two cams 81. Similarly, the spring 44 may consist of a block of elastomeric material or may be in the form of a spiral spring, with the spindle 47 then carrying out a relative rotational movement with respect to the body members 42 and 46.

The fixed support may consist of some other part of the vehicle, instead of being the gearbox casing.

Where the gearbox is of the kind in which selection of the gears is effected by rotation of the receptor element 60 and transition (as defined earlier herein) is effected by translational movement, an arrangement analagous to that described may be used. The cams and their body member, moving in rotation in a stepwise or discrete manner, then act to control rotation of the element 60 by interception of the output element 50 during a translational movement corresponding to a transition between gears. The functions of the two actuators then become a mirror image of those in the embodiments described above, with the first actuator displacing the output element in translational movement by virtue of the operation of the linkage.

What is claimed is:

1. A motorised gear shift control apparatus for a transmission gearbox having fixed gear ratios and a neutral position, the gearbox comprising a fixed structure and gear shifting means in the fixed structure for changing the transmission speed ratios, the apparatus comprising a first motorised actuator carried by the fixed structure, a receptor element, means mounting the receptor element in the fixed structure for movement therein, for actuating the gear shifting means of the gearbox, and a linkage coupling said first actuator to the receptor element, wherein the linkage comprises an input element coupled with the first actuator so as to be driven thereby, an output element coupled to the receptor element, and actuating means coupling the input element with the output element for actuating the latter, the output element of the linkage being so coupled with the receptor element as to form with it a moveable unit, wherein the apparatus further comprises means carried by the fixed structure and mounting the output element for movement in at least one of the senses comprising rotational movement and translational movement, a fixed support carried by the fixed structure, ramp means carried moveably by the fixed support, and a second motorised actuator carried by the fixed structure and coupled with the ramp means for moving the latter in discrete steps, the output element of the linkage being so disposed with respect to the ramp means that it can selectively intercept or traverse the ramp means.

2. Apparatus according to claim 1, wherein the actuating means of the linkage comprises a deformable intermediate element having energy accumulating means, and articulating means mounting the intermediate element on the input element.

3. Apparatus according to claim 2, wherein said intermediate element of the linkage comprises a cylinder and a piston carried by the cylinder for movement therein, and said energy accumulating means comprises resilient means engaged axially between the cylinder and the piston.

4. Apparatus according to claim 3, wherein the input element includes crank means, the apparatus further comprising a support hanger, means mounting the support hanger on the fixed structure, a carrier yoke carried by the support hanger, articulating means coupling said intermediate element of the linkage with the carrier yoke, and further articulating means coupling the intermediate element to said crank means of the input element, whereby the input element, intermediate element and carrier yoke together define three sides of a deformable parallelogram.

5. Apparatus according to claim 4, wherein one of the components consisting of the output element and ramp means includes two cams mounted in opposed relationship to each other and defining between them a slot for said output element of the linkage to pass through said slot when traversing the ramp means.

6. Apparatus according to claim 5, wherein the ramp means further comprise a cam-carrying core member formed with grooves, and spring means of predetermined stiffness mounted in said grooves and extending from one side of the cams to the other, the cams being mounted in said grooves in engagement with the spring means for transverse translational movement against the action of the spring means.

7. Apparatus according to claim 5, wherein each said cam has a cross section in the form of a trapezium defining two oppositely inclined portions and a flat portion joining said inclined portions.

8. Apparatus according to claim 7, wherein that one of the components selected from the output element and the ramp means which does not have said cams includes a lozenge-shaped end portion for cooperation with said inclined portions and flat portions of the cams.

9. Apparatus according to claim 2, wherein the output element comprises two levers and means articulating the two levers together, the linkage further comprising a rotary connection means coupling said levers to the intermediate member of the linkage, wherein one of said levers has a lozenge-shaped end portion for cooperation with the ramp means.

* * * * *